May 16, 1967 J. E. LANGE 3,319,358
ROTATING ZODIAC APPARATUS
Filed June 3, 1964 2 Sheets-Sheet 1
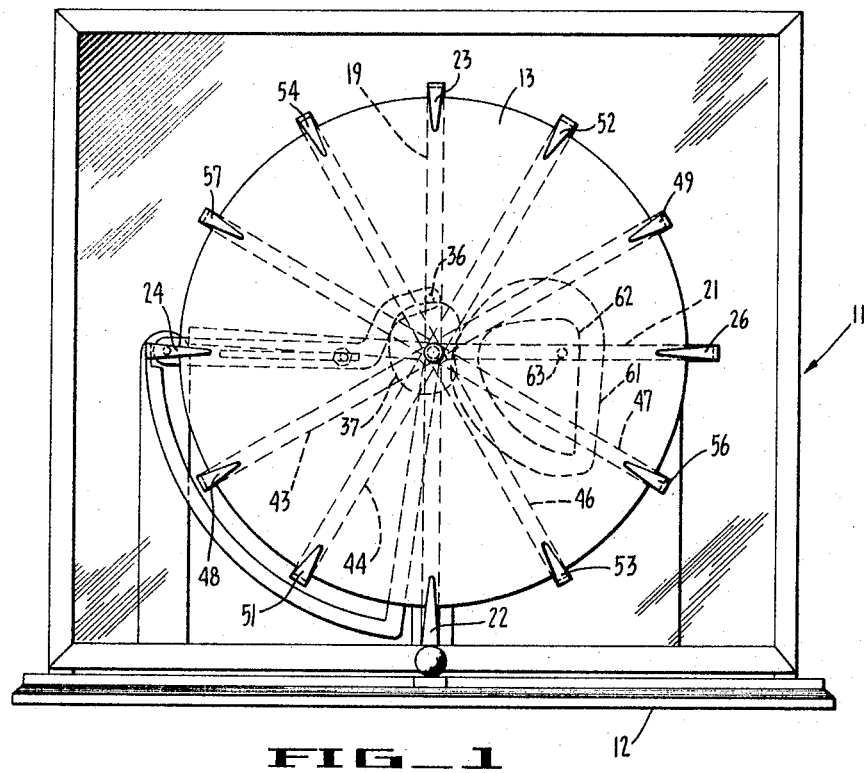
FIG_1
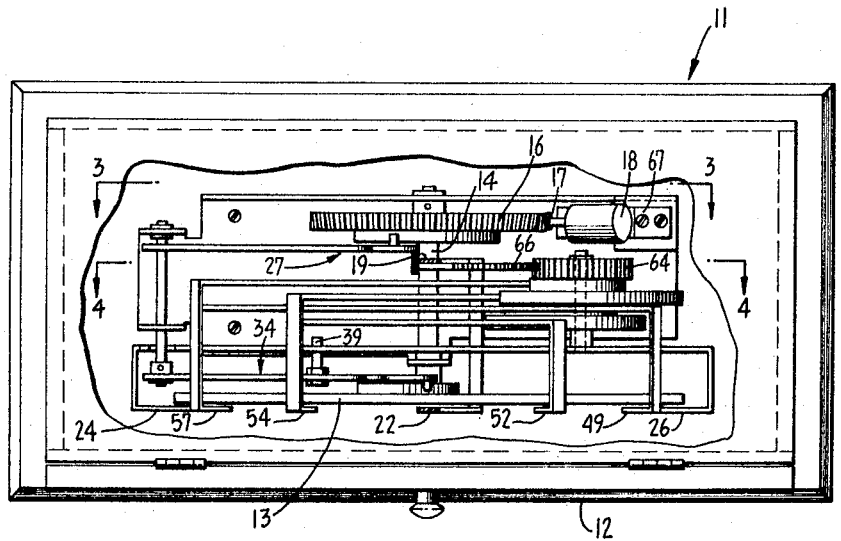
FIG_2
INVENTOR.
JOHN E. LANGE
BY
Gardner + Zimmerman
ATTORNEYS May 16, 1967     J. E. LANGE     3,319,358
ROTATING ZODIAC APPARATUS
Filed June 3, 1964     2 Sheets-Sheet 2
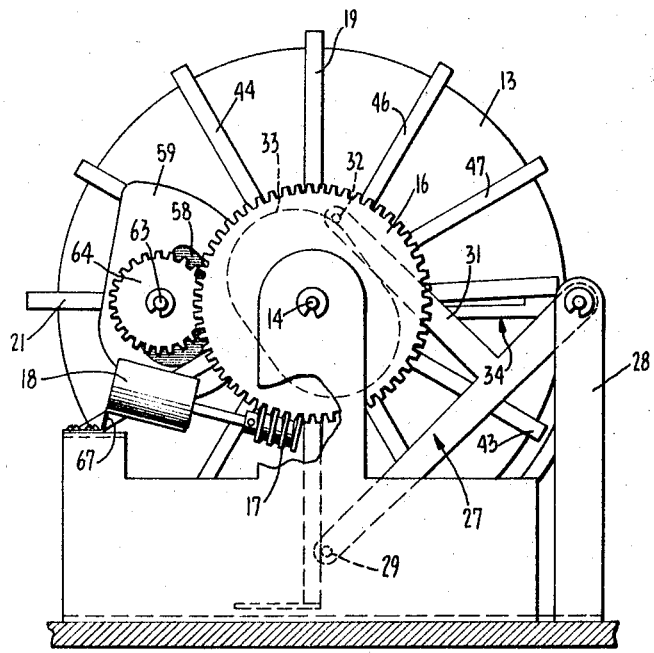
FIG_3
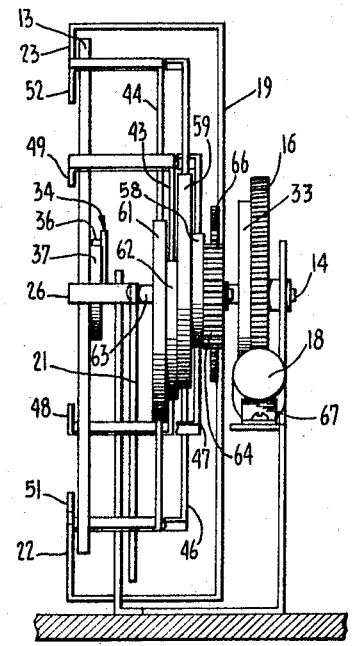
FIG_5
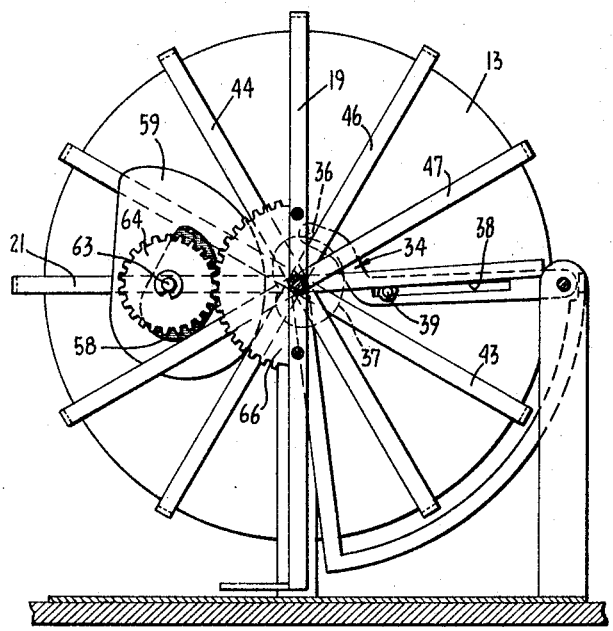
FIG_4
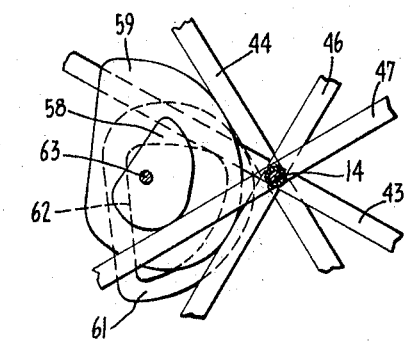
FIG_6
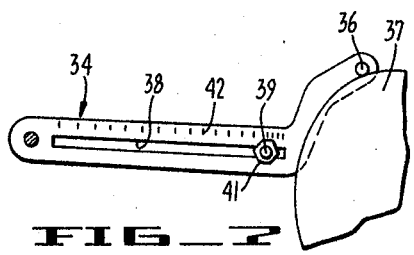
FIG_2
INVENTOR.
JOHN E. LANGE
BY
Gardner & Zimmerman
ATTORNEYS

United States Patent Office 3,319,358
Patented May 16, 1967

3,319,358
ROTATING ZODIAC APPARATUS
John E. Lange, 460 28th St., Oakland, Calif. 94609
Filed June 3, 1964, Ser. No. 372,189
7 Claims. (Cl. 35—43)

This invention relates to an apparatus for automatically indicating the positions of the twelve houses of heaven with respect to the zodiac such that horoscopes may be readily determined at any time without requirement of the usual complex mathematical computation of the astrological positions of the houses whose scheme is determinative of a horoscope.

In the casting of horoscopes it is necessary to first determine the positions of the twelve houses of heaven relative to the zodiac. These positions are indicative of the influence of the planets upon zodical signs at any given time. Generally it is necessary to first plot the position of the zodiac inasmuch as same continuously changes throughout the year. The house positions are then determined relative to the zodiac, usually through certain complex mathematical computations involving tables of logarithms and the like. The casting of horoscopes has thus been a rather tedious and complex procedure.

It is an object of the present invention to provide a device for continuously and automatically indicating the positions of the twelve horoscope houses with respect to the zodiac.

Another object of the invention is the provision of a device of the class described to which a circular zodiac chart may be secured, the device being arranged to rotate the chart with respect to peripheral house indicator hands which vary in angular position relative to each other in a predetermined relationship so as to be disposed adjacent angular graduations of the chart representing the house positions at any given time.

Still another object of the invention is to provide a device of the class described having meridian and horizon main indicators defining four sectors of a rotary zodiac disc, such indicators being arranged to vary in position as the disc rotates to in turn continuously vary the areas of the respective sectors throughout the day.

Yet another object of the invention is to provide a device of the class described having four secondary indicators with opposite ends in the four sectors defined by the main indicators and dividing each sector into three sub-sectors continuously in accordance with the Pythagoras classical ratio.

It is a further object of the invention to provide a device of the class described having a latitude adjustment for orienting the operation of the device to different geographical locations.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a front elevational view of the rotating zodiac device of the invention.

FIGURE 2 is a top view of the device with portions broken away to illustrate the interior construction.

FIGURE 3 is a sectional view taken at line 3—3 of FIGURE 2.

FIGURE 4 is a sectional view taken at line 4—4 of FIGURE 2.

FIGURE 5 is a transverse sectional view taken adjacent one side of the device.

FIGURE 6 is a fragmentary detail view of mechanism for moving the secondary indicator arms relative to each other.

FIGURE 7 is a fragmentary detail view of the latitude adjustment mechanism of the device.

Referring to FIGURE 1, the rotating zodiac device will be seen to include a generally rectangular cabinet 11 having a transparent front panel or door 12 which is hingedly mounted at the top front edge of the cabinet, or is otherwise arranged to facilitate access to the cabinet interior. Within the cabinet there is mounted a rotary disc 13 immediately behind the panel 12 so as to be viewable therethrough. The disc is adapted to carry a zodiac chart which is graduated in degrees and appropriately arranged with signs of the zodiac and the like. United States copyright registration No. 1p3825 was obtained by me on a chart of this type. With the use of such a chart alone, it has been previously necessary to compute the position of the zodiac and the angular positions of the twelve horoscope houses relative thereto, whereupon the house positions may be set off at the angular graduations of the chart. The various zodiac signs relative to the angular positions of the houses may then be employed to cast a horoscope. The foregoing procedure is eliminated with the present invention, the rotary disc 13 together with a plurality of house indicator arms, to be subsequently described in detail, being appropriately arranged to automatically indicate the angular positions of the houses with respect to the chart. In this regard the disc 13 is arranged to be rotated through substantially 361° in a period of twenty-four hours. Thus the position of any given point on the disc, and therefore of any given angle of a chart carried by the disc, at a particular hour of the day is progressively displaced through 360° in the period of a year. Movement of the disc consequently corresponds to movement of the sun in the zodiac. Rotation of the disc may, of course, be variously accomplished and in this regard the disc is preferably secured to a shaft 14, journalled within the cabinet, and which carries a gear 16 engaged by a worm gear 17 driven by an electric motor 18. The ratio of the gears 16, 17 is selected relative to the speed of the motor to effect the desired 361° rotation of the disc in a twenty-four hour period.

Considering now the house indicators in detail, it is to be noted that there are two main indicator arms 19, 21, the first being a meridian indicator and the second being a horizon indicator. These arms are provided with central apertures freely traversed by the shaft 14. The arms thus extend diametrically across the back of the disc and the opposite ends of the arms are re-entrantly turned to define indicator hands adjacent the front face of the disc at the periphery thereof. More particularly, meridian arm 19 has hands 22, 23 at its opposite ends which are respectively indicative of the fourth and tenth houses of heaven. Similarly, horizon arm 21 has hands 24, 26 respectively indicative of the first and seventh houses. Movement of the meridian arm is effected by means of a lever 27, as best shown in FIGURE 3, pivotally connected at one end to a post 28 projecting from the bottom of the cabinet at one side of the shaft 14. The free end of the lever carries a pin 29 for engaging the meridian arm 19. In addition the lever is provided with a right angularly projecting portion 31 at an intermediate position, and a pin 32 projecting from portion 31 engages an elliptical cam 33 rigidly secured to the shaft 14. Thus, as the shaft rotates, the cam pivots the lever 27 up and down and the lever in turn moves the meridian arm back and forth about a vertical center position.

Movement of the horizon arm 21 is effected in a similar manner as by means of a lever 34. Lever 34 is pivoted at one end to the post 28, both levers 34, 27 having a common pivot axis. The free end of lever 34 carries a pin 36 which rides upon a cardioid cam 37 secured to shaft 14 adjacent the rear face of disc 13. The lever is provided with a longitudinal slot 38 and a pin 39 is movable within the slot and securable at any desired position thereof. In this regard, the pin is preferably threaded adjacent its head such that a nut 41 may be selectively secured thereto. Thus the pin may be moved along the slot to any desired position and secured therein upon tightening of the nut. Graduations are provided adjacent the slot, as indicated at 42 (see FIGURE 7) which are representative of the latitudes of a number of geographical locations. The pin is set adjacent the latitude graduation of the particular area in which the device is to be operated. The pin 39 engages the horizon arm 21 and hence as the lever 34 is pivoted up and down in response to rotation of the cam 37 the pin 39 similarly moves the horizon arm. The excursion of horizon arm movement is of course varied in accordance with the latitude position of the pin 39. In this manner, the horizon arm hand 24 is at the same degree of a zodiac chart secured to the disc 13 as the degree the sun is positioned in the zodiac at sun rise. This degree is positioned at the meridian hand 23 at noon and is positioned a half degree below horizon hand 26 at sun set. During the course of a day the main indicator arms divide the disc into four sectors whose angular extents continuously vary about 90°. As one sector becomes less than 90° the adjacent sector becomes greater than 90°.

Considering now the secondary indicator arms, it is to be noted that four of these arms 43, 44, 46, 47 are freely centrally pivoted upon the shaft 14. The opposite ends of arm 43 are provided with reentrant indicator hands 48, 49 respectively representative of the second and eighth houses. The opposite ends of arm 44 are similarly provided with third and ninth house indicator hands 51, 52 and arm 46 is provided with fifth and eleventh house indicator hands 53, 54. Arm 47 is provided with sixth and twelfth indicator hands 56, 57. Correlated movement of arms 43, 44, 46, 47 is effected by a set of cams 58, 59, 61, 62 secured to a shaft 63 journalled for rotation upon the horizon arm 21 on the side thereof which includes house indicator hand 26. A gear 64 is likewise secured to shaft 63 and this gear engages a semicircular gear 66 secured to meridian arm 19, as best shown in FIGURE 4. It will be thus appreciated that as the main arms move back and forth from their positions the gear 66 in engaging gear 64 oscillates the shaft 63 first in one direction and then in the other. The secondary arms engage the cams as shown in FIGURE 6 and with the illustrated configurations of the cams, movement of each pair of secondary arms in a sector defined between the primary arms 19, 21 proceeds such that the three sub-sectors between the primary arms are continuously in accordance with the Pythagoras classical ratio (5:4:3 or 3:4:5), except when the sectors are 90°. More particularly, when the main indicators 19, 21 are vertically and horizontally oriented such that 90° sectors are defined therebetween, the secondary indicator arms are disposed at equal angular intervals of 30°. However, when the main indicators move to define successive sectors of greater and less than 90° the secondary indicator arms are no longer equally angularly positioned. Instead in a sector larger than 90°, the secondary indicator arms are disposed such that the first sub-sector in a counterclockwise direction (as viewed from the front of the disc 13) from a main indicator is larger than the next sub-sector which is in turn larger than the third sub-sector in a 5:4:3 ratio. Conversely in a sector smaller than 90°, the first sub-sector in the counter-clockwise direction from a main indicator is smaller than the next sub-sector which is smaller than the third sub-sector in a 3:4:5 ratio. When the indicator arms are thus moved while the disc is rotated 361° in a twenty-four hour period, the house indicator hands are appropriately positioned with respect to the zodiac, as represented by a zodiac chart secured to the disc, such that a horoscope may be immediately cast.

In order to permit setting the disc in a desired position with respect to the geographical location and time, the motor 18 is mounted on a spring 67 which serves to keep the worm gear 17 in resilient engagement with gear 16. Thus by simply depressing the motor against the resistance of the spring, the disc may be rotated by hand to the desired setting position. This action also facilitates casting of horoscopes for different locations and times.

What is claimed is:

1. A rotary zodiac apparatus comprising a disc having displayed thereon a circular zodiac chart, means mounting said disc for rotation, means driving said disc to rotate same 361° in a twenty-four hour period, a pair of main indicator arms mounted for free rotation diametrically of and adjacent said disc, means cooperating with said disc and said main indicator arms for oscillating the latter respectively about vertical and horizontal center positions in response to disc rotation, a plurality of secondary indicator arms mounted for free rotation diametrically and adjacent said disc, and means coupled between said main indicator arms and said secondary indicator arms for oscillating the latter through angular distances in a predetermined ratio in response to movement of the former, said main indicator arm having a horizontal center position being adjustable in the extent of its movement to compensate for latitude difference in different geographical areas, said means cooperating with said disc and said main indicator arms for oscillating the latter in response to disc rotation includes for each of said arms, a cam secured to said disc for rotation therewith and a lever arrangement for transmitting the motion of said cam to the respective one of said arms, and said means coupled between said main indicator arms and said secondary indicator arms for oscillating the latter in response to movement of the former includes a drive cam for each of said secondary indicator arms mounted on one of said main indicator arms and in engagement with its associated secondary arm and gear means correlating the orientation of said drive cams on said one of said main arms with the movement of the other of said main arms.

2. A rotary zodiac apparatus according to claim 1, wherein said main indicator arms define four sectors of said disc respectively having angular extents which vary between angles greater and less than 90° during movement of the main indicator arms, and said secondary indicator arms are disposed with two of same in each of said sectors to divide each one thereof into three sub-sectors, said secondary indicator arms being oscillated such that the angular extents of the three sub-sectors in a counterclockwise direction from one of said main indicator arms are in a 5:4:3 ratio when the sector is greater than 90° and in a 3:4:5 ratio when the sector is less than 90° while being equal when the sector is equal to 90°.

3. A rotary zodiac apparatus comprising a disc having displayed thereon a circular zodiac chart, a shaft secured to said disc and mounting same for rotation, drive means coupled to said shaft for rotating same 361° in a twenty-four hour period, a meridian indicator arm freely rotatably disposed on said shaft adjacent said disc to represent the meridian, an elliptical cam secured to said shaft, a lever, means pivotally mounting one end of said lever, said lever having a pin at its free end engaging said meridian arm and a projecting portion with a follower pin engaging said elliptical cam, said lever thereby moving said meridian arm back and forth with respect to said disc about a vertical center position in response to rotation of said cam, a horizon indicator arm freely rotatably disposed on said shaft adjacent said disc to represent the horizon, a cardioid cam secured to said shaft, a second lever, means pivotally mounting one end of said second lever, said second lever having a follower pin at its free end engaging said cardioid cam and a pin at an intermediate position engaging said horizon indicator arm to move same up and down about a horizontal center position with respect to said disc in response to rotation of said cardioid cam, four secondary indicator arms freely rotatably disposed on said shaft adjacent said disc, a set of four secondary indicator drive cams, a second shaft secured to said drive cams and journalled upon said horizon indicator arm, said second indicator arms engaging said drive cams and being moved angularly in the sectors of said disc defined between said meridian and horizon indicator arms in response to rotation of said drive cams, a gear secured to said second shaft, and a second gear secured to said meridian arm and engaging said first gear to effect oscillatory rotation of said drive cams in response to said movement of said meridian and horizon arms about their center positions.

4. A rotary zodiac apparatus according to claim 3, wherein two of said secondary indicator arms are disposed in each sector defined between said meridian and horizon indicator arms to thereby divide each sector into three sub-sectors, and said drive cams are configured to move said secondary indicator arms to angular positions in which the angular extents of said three sub-sectors of each sector in a counterclockwise from said meridian and horizon indicator arms are in a 5:4:3 ratio when the sector is greater than 90° and in a 3:4:5 ratio when the sector is less than 90° and to equal angular extents when the sector is equal to 90°.

5. A rotary zodiac apparatus according to claim 4, wherein said pin at an intermediate position of said second lever is adjustably positionable longitudinally of the second lever to effect adjustment for different latitudes of different geographical locations.

6. A rotary zodiac apparatus in accordance with claim 1, further defined by means for selectively decoupling the disc from the driving means to permit free rotation of the disc.

7. A rotary zodiac apparatus in accordance with claim 3, wherein said drive for rotating the shaft includes a gear fixedly mounted on said shaft, a second gear meshing with said first gear, a motor for driving said second gear, and mounting means for said motor resiliently and releasably retaining said gears in meshing engagement.

References Cited by the Examiner
UNITED STATES PATENTS

| | | | |
|---|---|---|---|
| 521,725 | 6/1894 | Molesworth | 58—3 |
| 2,219,378 | 10/1940 | Booth | 35—44 |

FOREIGN PATENTS

| | | |
|---|---|---|
| 480,518 | 2/1938 | Great Britain. |

JEROME SCHNALL, *Primary Examiner.*

UNITED STATES PATENT OFFICE
Certificate of Correction

Patent No. 3,319,358                                      May 16, 1967

John E. Lange

It is hereby certified that error appears in the above numbered patent requiring correction and that the said Letters Patent should read as corrected below.

In the drawings, Sheet 1, FIG. 1 should appear as shown below instead of as in the patent:

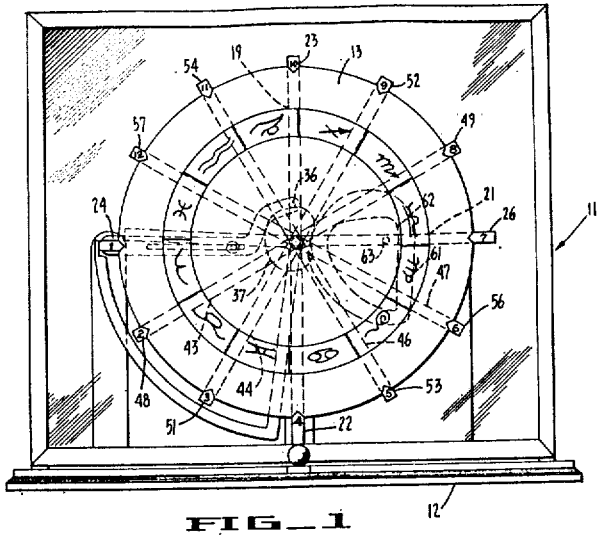

FIG—1

Signed and sealed this 14th day of November 1967.

[SEAL]
Attest:
EDWARD M. FLETCHER, JR.,
*Attesting Officer.*

EDWARD J. BRENNER,
*Commissioner of Patents.*